(12) United States Patent
Azadet et al.

(10) Patent No.: US 7,257,329 B2
(45) Date of Patent: Aug. 14, 2007

(54) DUOBINARY PULSE SHAPING FOR OPTICAL TRANSMISSION SYSTEMS EMPLOYING PULSE AMPLITUDE MODULATION TECHNIQUES

(75) Inventors: Kameran Azadet, Morganville, NJ (US); Fadi Ryad Olivier Saibi, Red Bank, NJ (US)

(73) Assignee: Agere Systems Inc., Allentown, PA (US)

( * ) Notice: Subject to any disclaimer, the term of this patent is extended or adjusted under 35 U.S.C. 154(b) by 577 days.

(21) Appl. No.: 10/378,096

(22) Filed: Feb. 28, 2003

(65) Prior Publication Data

US 2004/0057733 A1     Mar. 25, 2004

Related U.S. Application Data

(60) Provisional application No. 60/412,870, filed on Sep. 23, 2002.

(51) Int. Cl.
*H04B 10/04* (2006.01)
*H04B 10/12* (2006.01)

(52) U.S. Cl. .................................. 398/183; 398/186

(58) Field of Classification Search ................ 398/183, 398/202, 186; 375/290, 291
See application file for complete search history.

(56) References Cited

U.S. PATENT DOCUMENTS 3,569,955 A * 3/1971 Maniere ...................... 341/56
6,424,444 B1   7/2002 Kahn et al. ................ 359/173
6,490,069 B1 * 12/2002 Kahn et al. ................ 398/183

OTHER PUBLICATIONS

P. Kabal et al., "Partial-Response Signaling", IEEE Transactions on Communications, vol. 23, No. 9, Sep. 1975.*

European Patent Office search report dated Mar. 13, 2006 (submitted by Applicant together with IDS filed on May 18, 2006).*
Yonenaga et al., "Dispersion-Tolerant Optical Transmission System Using Duobinary Transmitter and Binary Receiver," Journal of Lightwave Tehcnology, vol. 15, No. 8 (Aug. 1997).
Franck et al., "Duobinary Transmitter with Low Intersymbol Interference," IEEE Photonics Technology Letters, vol. 10, No. 4 (Apr. 1998).
Kaiser et al., Reduced Complexity Optical Duobinary 10-Gb/s Transmitter Setup Resulting in an Increased Transmission Distance, IEEE Photonics Technology Letters, vol. 13, No. 8 (Aug. 2001).
Walkin et al., "Multilevel Signaling for Increasing the Reach of 10 Gb/s Lightwave Systems," J. of Lightwave Technology, vol. 17, No. 11 (Nov. 1999).

* cited by examiner

*Primary Examiner*—Shi K. Li

(57) ABSTRACT

A duobinary optical communication system is disclosed that employs pulse amplitude modulation (PAM) techniques to provide further improvements in spectral efficiency. A disclosed PAM duobinary optical transmitter converts a plurality of input bits to an N level signal using PAM techniques; adds a current N level signal to a previous N level signal to produce a 2N−1 level signal; and converts the 2N−1 level signal to an optical signal for transmission to a receiver. A disclosed PAM duobinary optical receiver detects a power level of the received optical signal (encoded using pulse amplitude modulation and duobinary encoding techniques to encode a plurality of bits) and maps the detected power level to a plurality of bits to return the transmitted information. An exemplary PAM-4 duobinary optical communication system combines PAM-4 modulation techniques with duobinary pulse shaping techniques to provide an overall factor of four improvement in spectral efficiency by reducing the bandwidth of the optical signal.

20 Claims, 2 Drawing Sheets

DUOBINARY PULSE SHAPING FOR OPTICAL TRANSMISSION SYSTEMS EMPLOYING PULSE AMPLITUDE MODULATION TECHNIQUES

CROSS REFERENCE TO RELATED APPLICATIONS

This application claims the benefit of U.S. Provisional Application No. 60/412,870, filed Sep. 23, 2002.

FIELD OF THE INVENTION

The present invention relates generally to optical communication systems and, more particularly, to optical communication systems employing duobinary, multilevel pulse-amplitude modulation techniques.

BACKGROUND OF THE INVENTION

The explosive growth of digital communications technology has resulted in an ever-increasing demand for bandwidth for communicating digital information, such as data, audio and/or video information. To keep pace with the increasing bandwidth demands, new or improved network components and technologies must constantly be developed to perform effectively at the ever-increasing data rates. In optical communication systems, however, the cost of deploying improved optical components becomes prohibitively expensive at such higher data rates. For example, it is estimated that the cost of deploying a 40 Gbps optical communication system would exceed the cost of existing 10 Gbps optical communication systems by a factor of ten. Meanwhile, the achievable throughput increases only by a factor of four.

Thus, much of the research in the area of optical communications has attempted to obtain higher throughput from existing optical technologies. In conventional optical transmission systems, dispersion compensation typically requires expensive optical compensators. In order to relax the need for dispersion compensating modules (DCM), duobinary pulse shaping techniques have been considered for optical channels. Duobinary pulse shaping techniques reduce the required signal bandwidth by a factor of two by mapping a binary data signal to a three-level signal.

Typically, duobinary modulation formats employ two signal levels (+1 and −1) to represent a binary value of one, and one signal level (0) to represent a binary value zero. The narrow spectral width of duobinary signals, compared to a conventional non-return-to-zero (NRZ) binary signal, has been exploited to minimize dispersion sensitivity and to enable dense wavelength division multiplexing techniques. It has been observed that modulating an optical signal with a duobinary electrical signal, as opposed to a standard non-return to zero (NRZ) signal, reduces the optical spectrum by a factor of two.

A need exists for an optical communication system that employs duobinary pulse shaping techniques to provide further improvements in spectral efficiency. Among other benefits, improved spectral efficiency will allow greater tolerance to dispersion and the use of generic and available optical technologies. A factor of four improvement in spectral efficiency, for example, would provide a 40 Gbps optical communication system using existing 10 Gbps optical communication systems.

SUMMARY OF THE INVENTION

Generally, a duobinary optical communication system is disclosed that employs pulse amplitude modulation (PAM) techniques to provide further improvements in spectral efficiency. A disclosed PAM duobinary optical transmitter converts a plurality of input bits to an N level signal using PAM techniques; adds a current N level signal to a previous N level signal to produce a 2N−1 level signal; and converts the 2N−1 level signal to an optical signal for transmission to a receiver. The plurality of input bits can be converted to the N level signal by adding a current plurality of input bits to a previous plurality of output bits.

Similarly, a disclosed PAM duobinary optical receiver detects a power level of the received optical signal (encoded using pulse amplitude modulation and duobinary encoding techniques to encode a plurality of bits) and maps the detected power level to a plurality of bits to return the transmitted information. The detection of the power level of the received optical signal can also convert the optical signal to an electrical signal. A squaring operation can be performed to convert the optical signal to an electrical signal. The squaring operation automatically converts the received 2N−1 level signal to an N level signal.

In one exemplary implementation, PAM-4 modulation techniques are combined with duobinary pulse shaping techniques to provide an overall factor of four improvement in spectral efficiency by reducing the bandwidth of the optical signal. In this manner, for example, a 2.5 Gbps optical communication system can be upgraded to provide a 10 Gbps optical communication system and a 10 Gbps optical communication system can be upgraded to provide a 40 Gbps optical communication system within the same bandwidth.

A more complete understanding of the present invention, as well as further features and advantages of the present invention, will be obtained by reference to the following detailed description and drawings.

DETAILED DESCRIPTION

Figure 1:
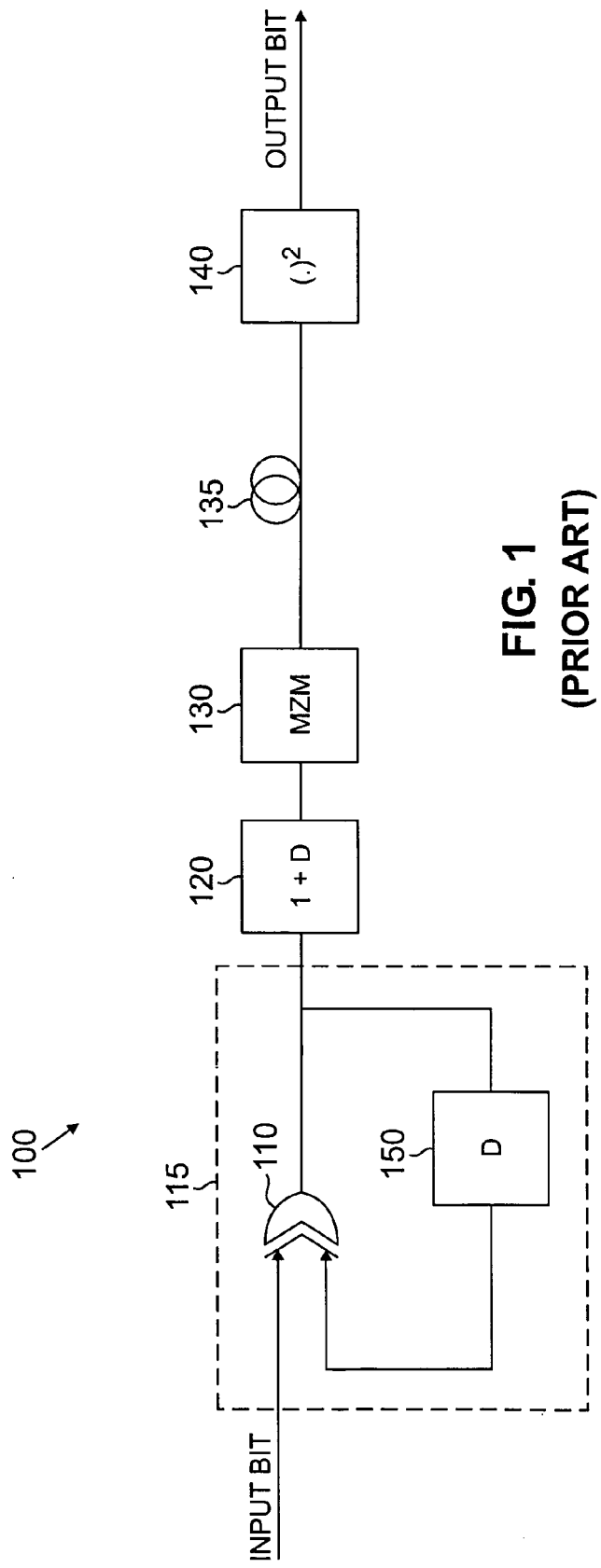
FIG. 1 is a schematic block diagram of an exemplary conventional duobinary optical communication system.

FIG. 1 is a schematic block diagram of an exemplary conventional duobinary optical communication system 100 that employs three levels to encode each bit. As shown in FIG. 1, the input bit is applied to one terminal of an exclusive or (XOR) gate 110 and the previous bit is applied to the second terminal of the XOR gate 110. The previous bit is obtained by a feedback loop containing a delay element 150. The XOR gate 110 and delay element 150 comprise a precoder 115 that introduces a correlation into the transmitted signal by adding the previous output bit to the current input bit. Thus, the precoder 115 is said to perform a 1/(1+D) {mod 2} operation, where D is a delay operation that delays the sequence of bits by one bit interval.

The output of the precoder 115 is a two level value (0 or 1) that is applied to an encoder 120 that maps the two level value to a three level value. In particular, for a given bit interval, the encoder 120 adds the previous and current bit levels together to produce a three level value (0, 1, 2) according to the following table:

| Previous Bit | Current Bit | Three Level Value |
|---|---|---|
| 1 | 1 | 2 |
| 1 | 0 | 1 |
| 0 | 1 | 1 |
| 0 | 0 | 0 |

The three level value generated by the encoder 120 is applied to a Mach Zehnder modulator 130 that maps each of the three levels (0, 1, 2) to a corresponding voltage level (−V, 0, +V), in a known manner. The generated voltage level is then converted to an optical signal (−e, 0, +e) and applied to an optical fiber 135.

As shown in FIG. 1, the receiver includes a power detector 140 that decodes the received optical signal. Typically, the power detector 140 performs an optical to electrical conversion by performing a squaring operation on the received signal. Since the received signal can have one of three optical values (−e, 0, e), the squaring operation returns the signal to +$e^2$, or 0. Thereafter, the two levels generated by the power detector 140 are mapped to the corresponding one bit binary value. In this manner, the Mod 2 operation at the receiver is automatically obtained by going through the mapping table and from the optical to electrical domain (−V is equivalent to +V when measuring intensity). Thus, the bit at the output of the duobinary optical communication system 100 is equal to the input bit.

The duobinary optical communication system 100 provides a factor of two bandwidth reduction of the optical spectrum and thus improves performance in the presence of dispersion. The overall transfer function of the duobinary optical communication system 100 is expressed as follows:

$$1/(1+D) \times (1+D)\{\text{mod}2\} = 1\ \{\text{mod}2\}.$$

For a more detailed discussion of a suitable conventional duobinary optical communication system 100, see for example, Kazushige Yonenaga and Shigeru Kuwano, "Dispersion-Tolerant Optical Transmission System Using Duobinary Transmitter and Binary Receiver," J. of Lightwave Technology, Vol. 15, No. 8, 1530-1537 (August, 1997), incorporated by reference herein.

According to one aspect of the present invention, duobinary pulse shaping techniques are employed in conjunction with pulse amplitude modulation (PAM) techniques. The present invention thus recognizes that the spectral efficiency improvements obtained using duobinary pulse shaping techniques can be further improved by taking advantage of PAM modulation. In one exemplary implementation, PAM-4 modulation techniques are combined with duobinary pulse shaping techniques to provide an overall factor of four improvement in spectral efficiency by reducing the bandwidth of the optical signal. In this manner, for example, a 2.5 Gbps optical communication system can be upgraded to provide a 10 Gbps optical communication system and a 10 Gbps optical communication system can be upgraded to provide a 40 Gbps optical communication system within the same bandwidth.

Figure 2:
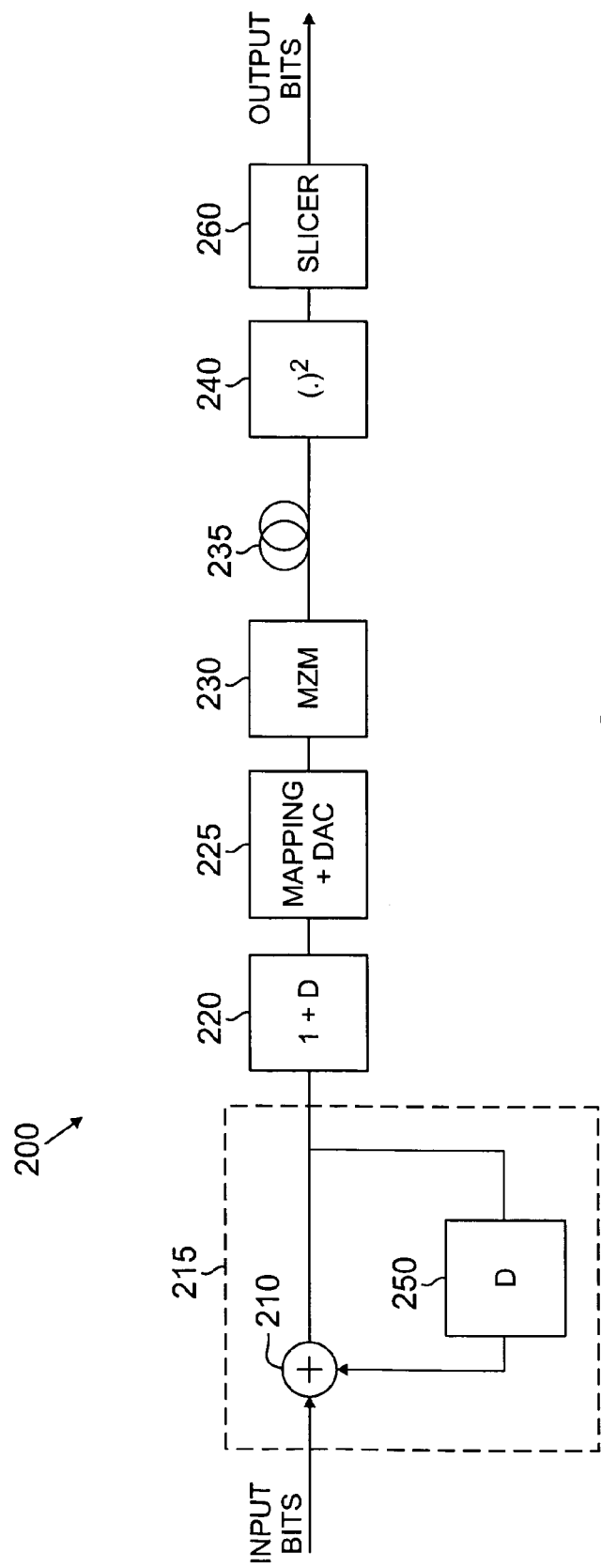
FIG. 2 is a schematic block diagram of an exemplary PAM-4 duobinary optical communication system incorporating features of the present invention.

FIG. 2 is a schematic block diagram of an exemplary PAM-4 duobinary optical communication system 200 incorporating features of the present invention. As shown in FIG. 2, in an exemplary PAM-4 implementation, two input bits, comprising four levels, are applied to one terminal of a modulo 4 adder 210 and the previous four level value is applied to the second terminal of the adder 210. The previous four level value is obtained by a feedback loop containing a delay element 250. The adder 210 and delay element 250 comprise a precoder 215 that introduces a correlation into the transmitted signal by adding the previous four level output value to the current four level input value. Thus, the precoder 215 is said to perform a 1/(1+D) {mod 4} operation and the output is a four level value.

The four level output of the precoder 215 is applied to an encoder 220 that maps the four levels to a seven level value (0, 1, 2, 3, 4, 5, 6). In particular, for a given bit interval, the encoder 220 adds the previous and current four level values together to produce a seven level value according to the following table:

| Previous Four Level Value | Current Four Level Value | Seven Level Value |
|---|---|---|
| 0 | 0 | 0 |
| 0 | 1 | 1 |
| 0 | 2 | 2 |
| 0 | 3 | 3 |
| 1 | 0 | 1 |
| 1 | 1 | 2 |
| 1 | 2 | 3 |
| 1 | 3 | 4 |
| 2 | 0 | 2 |
| 2 | 1 | 3 |
| 2 | 2 | 4 |
| 2 | 3 | 5 |
| 3 | 0 | 3 |
| 3 | 1 | 4 |
| 3 | 2 | 5 |
| 3 | 3 | 6 |

The seven level value generated by the encoder 220 is applied to a digital to analog converter (DAC) 225 that maps the seven level value to a corresponding voltage. For example, the digital to analog converter 225 may employ the following exemplary mapping:

(0, 1, 2, 3, 5, 4)→(−3V, −2V, −V, 0, V, 2V, 3V), respectively.

It is noted that other mappings by the digital to analog converter 225 are possible. A Mach Zehnder modulator 230 then maps each of the seven voltage levels (−3V, −2V, −V, 0, V, 2V, 3V) to a corresponding optical signal signal (−3e, −2e, −e, 0, e, 2e, 3e) and the optical signal is applied optical fiber 235.

As shown in FIG. 2, the receiver includes a power detector 240 that decodes the received optical signal. Typically, the power detector 240 performs an optical to electrical conversion by performing a squaring operation on the received signal. Since the received signal can have one of seven optical values (−3e, −2e, −e, 0, e, 2e, 3e), the squaring operation returns the signal to +$9e^2$, +$4e^2$, +$e^2$, or 0. Thereafter, a slicer 260 maps the four levels generated by the power detector 240 to the corresponding two bit binary value. In this manner, the Mod 4 operation at the receiver is automatically obtained by going through the mapping table of the slicer 260 and from the optical to electrical domain (−V is equivalent to +V when measuring intensity). Thus, the two bits at the output of the PAM-4 duobinary optical communication system 200 are equal to the input bits.

The PAM-4 duobinary optical communication system 200 provides a factor of four bandwidth reduction of the optical spectrum and thus improves performance in the presence of dispersion. The overall transfer function of the duobinary optical communication system 200 is expressed as follows:

$$1/(1+D) \times (1+D) \{\mod 4\} = 1 \{\mod 4\}.$$

It is to be understood that the embodiments and variations shown and described herein are merely illustrative of the principles of this invention and that various modifications may be implemented by those skilled in the art without departing from the scope and spirit of the invention.

We claim:

1. A method for transmitting information, said method comprising the steps of:
    converting a plurality of input bits to an N level signal;
    adding a current N level signal to a previous N level signal to produce a 2N−1 level signal, wherein said 2N−1 level signal is mapped to a corresponding voltage value using a reordered set of said 2N−1 levels such that following a squaring operation at a receiver a received signal appears as a modulo N operation; and
    converting said 2N−1 level signal to an optical signal for transmission to said receiver.

2. The method of claim 1, wherein said step of converting a plurality of input bits to an N level signal further comprises the step of adding a current plurality of input bits to a previous plurality of output bits to produce said N level signal.

3. The method of claim 2, wherein said previous plurality of output bits are obtained using a delay operator.

4. The method of claim 2, wherein said step of converting a plurality of input bits to an N level signal implements a 1/1(1+D) {mod N}operation, where D is a delay operation that delays a sequence of bits by one bit interval.

5. The method of claim 1, wherein said optical signal is received by a receiver and wherein said receiver further comprises the steps of detecting a power level of said received optical signal and mapping said detected power level to a plurality of bits.

6. The method of claim 1, wherein said adding step further comprises the step of mapping a seven level value to a corresponding voltage value, as follows: (0, 1, 2, 3, 6, 5, 4)→(−3V, −2V, −V, 0, V, 2V, 3V), respectively.

7. The method of claim 6, wherein said mapping is performed by a digital to analog converter.

8. A method for receiving information, said method comprising the steps of:
    receiving an optical signal, said optical signal is encoded using pulse amplitude modulation and duobinary encoding techniques to encode a plurality of bits;
    detecting a power level of said received optical signal; and
    mapping said detected power level to a plurality of bits, wherein a 2N−1 level signal is mapped to a corresponding voltage value using a reordered set of said 2N−1 levels such that following a squaring operation the received signal appears as a modulo N operation.

9. The method of claim 8, wherein said detecting step further comprises the step of converting said optical signal to an electrical signal.

10. The method of claim 9, wherein said step of converting said optical signal to an electrical signal performs a squaring operation on the optical signal.

11. The method of claim 10, wherein said squaring operation converts a 2N−1 level signal to an N level signal.

12. A system for transmitting information, said system comprising:
    a precoder for converting a plurality of input bits to an N level signal;
    an adder for adding a current N level signal to a previous N level signal to produce a 2N−1 level signal, wherein said 2N−1 level signal is mapped to a corresponding voltage value using a reordered set of said 2N−1 levels such that following a squaring operation at a receiver a received signal appears as a modulo N operation; and
    a digital to analog converter for converting said 2N−1 level signal to an optical signal for transmission to said receiver.

13. The system of claim 12, wherein said precoder comprises an adder for adding a current plurality of input bits to a previous plurality of output bits to produce said N level signal.

14. The system of claim 13, wherein said previous plurality of output bits are obtained using a delay operator.

15. The system of claim 13, wherein said precoder implements a 1/(1+D) {mod N}operation, where D is a delay operation that delays a sequence of bits by one bit interval.

16. The system of claim 12, wherein said optical signal is received by a receiver and wherein said receiver further comprises a power detector for detecting a power level of said received optical signal and a slicer for mapping said detected power level to a plurality of bits.

17. A system for receiving information, said system comprising:
    an input port for receiving an optical signal, said optical signal is encoded using pulse amplitude modulation and duobinary encoding techniques to encode a plurality of bits;
    a power detector for detecting a power level of said received optical signal; and
    a slicer for mapping said detected power level to a plurality of bits, wherein a 2N−1 level signal is mapped to a corresponding voltage value using a reordered set of said 2N−1 levels such that following a squaring operation the received signal appears as a modulo N operation.

18. The system of claim 17, wherein said power detector converts said optical signal to an electrical signal.

19. The system of claim 18, wherein said optical to electrical conversion performs a squaring operation on the optical signal.

20. The system of claim 19, wherein said squaring operation converts a 2N−1 level signal to an N level signal.

* * * * *